(12) United States Patent
Li et al.

(10) Patent No.: US 10,965,800 B2
(45) Date of Patent: Mar. 30, 2021

(54) INTERACTION METHOD IN CALL AND DEVICE

(71) Applicant: Huawei Technologies Co., Ltd., Shenzhen (CN)

(72) Inventors: Yan Li, Shenzhen (CN); Yu Zhu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/303,326

(22) PCT Filed: May 20, 2016

(86) PCT No.: PCT/CN2016/082868
§ 371 (c)(1),
(2) Date: Nov. 20, 2018

(87) PCT Pub. No.: WO2017/197650
PCT Pub. Date: Nov. 23, 2017

(65) Prior Publication Data
US 2019/0222684 A1    Jul. 18, 2019

(51) Int. Cl.
*H04M 1/00* (2006.01)
*H04M 3/42* (2006.01)
(Continued)

(52) U.S. Cl.
CPC ............. *H04M 1/271* (2013.01); *H04M 1/05* (2013.01); *H04M 1/2745* (2013.01);
(Continued)

(58) Field of Classification Search
CPC ............... H04M 1/271; H04M 1/6041; H04M 1/72519; H04M 1/72563; H04M 1/72583;
(Continued)

(56) References Cited

U.S. PATENT DOCUMENTS

D506,058 S  *  6/2005  Sexson ............................. D3/218
7,246,062 B2    7/2007  Knott et al.
(Continued)

FOREIGN PATENT DOCUMENTS

CN       1780318 A       5/2006
CN     102209143 A      10/2011
(Continued)

OTHER PUBLICATIONS

Machine Translation and Abstract of Chinese Publication No. CN1780318, May 31, 2006, 6 pages.
(Continued)

*Primary Examiner* — Quochien B Vuong
(74) *Attorney, Agent, or Firm* — Conley Rose, P.C.

(57) ABSTRACT

An interaction method in a call and a device, where the method includes displaying a voice assistant icon on a call screen of the wearable device when a phone number of a communication peer device is a service number converting received voice information into a dual tone multi frequency (DTMF) tone when the voice assistant icon is activated, and sending the DTMF tone to the communication peer device. Therefore, in a process of making or answering a service call using the wearable device, under a specific trigger condition, voice information of a user is converted into a DTMF tone to be sent to the communication peer device. In this way, when the user needs to enter a digit or a symbol in a call process, it can be ensured that the user enters correct information, and user experience is improved.

19 Claims, 12 Drawing Sheets

(51) Int. Cl.
    *H04B 1/38*     (2015.01)
    *H04M 1/27*     (2006.01)
    *H04M 1/725*     (2021.01)
    *H04M 1/2745*     (2020.01)
    *H04M 1/05*     (2006.01)
    *H04M 1/27475*     (2020.01)
    *H04M 1/60*     (2006.01)
    *H04M 3/493*     (2006.01)

(52) U.S. Cl.
    CPC ..... *H04M 1/27475* (2020.01); *H04M 1/6041* (2013.01); *H04M 1/725* (2013.01); *H04M 1/7253* (2013.01); *H04M 1/72519* (2013.01); *H04M 1/72527* (2013.01); *H04M 1/72563* (2013.01); *H04M 1/72583* (2013.01); *H04M 3/4938* (2013.01); *H04M 2250/02* (2013.01); *H04M 2250/74* (2013.01)

(58) Field of Classification Search
    CPC .. H04M 2250/74; H04M 3/385; H04M 3/436; H04M 3/493; H04M 3/5183; H04M 2201/40; H04M 2201/41; H04M 2203/256; H04M 2250/02; H04W 88/02; H04W 4/44; H04B 1/3822; H04B 1/3833; H04B 1/385; H04Q 2213/13405
    USPC .................. 455/556.1, 556.2, 557, 563, 566
    See application file for complete search history.

(56) References Cited

U.S. PATENT DOCUMENTS

| | | | |
|---|---|---|---|
| 7,502,742 | B2 | 3/2009 | Knott et al. |
| 8,990,071 | B2* | 3/2015 | Ju .................. H04M 1/505 704/201 |
| 9,207,906 | B2* | 12/2015 | Kim .................. G06F 17/21 |
| 10,264,410 | B2* | 4/2019 | Park .................. H04B 1/385 |
| 2002/0090066 | A1 | 7/2002 | Gupta et al. |
| 2005/0216268 | A1 | 9/2005 | Kannappan |
| 2005/0277452 | A1* | 12/2005 | Pasamba .............. H04B 1/385 455/575.6 |
| 2007/0189267 | A1* | 8/2007 | Metcalf ............. H04M 3/42195 370/352 |
| 2009/0132256 | A1 | 5/2009 | Geldbach et al. |
| 2011/0238414 | A1 | 9/2011 | Ju et al. |
| 2012/0071202 | A1 | 3/2012 | Zheng |
| 2014/0120987 | A1* | 5/2014 | Kim .................. G06F 17/21 455/563 |
| 2016/0345874 | A1* | 12/2016 | Raisoni ................. A61B 5/002 |

FOREIGN PATENT DOCUMENTS

| | | |
|---|---|---|
| CN | 102917143 A | 2/2013 |
| CN | 103558916 A | 2/2014 |

OTHER PUBLICATIONS

Machine Translation and Abstract of Chinese Publication No. CN102917143, Feb. 6, 2013, 9 pages.
Machine Translation and Abstract of Chinese Publication No. CN103558916, Feb. 5, 2014, 37 pages.
Foreign Communication From a Counterpart Application, PCT Application No. PCT/CN2016/082868, English Translation of International Search Report dated Feb. 16, 2017, 2 pages.
Foreign Communication From a Counterpart Application, PCT Application No. PCT/CN2016/082868, English Translation of Written Opinion dated Feb. 16, 2017, 5 pages.
Foreign Communication From a Counterpart Application, European Application No. 16902034.4, Extended European Search Report dated Jan. 8, 2019, 7 pages.

\* cited by examiner

Original call interface

New interface

US 10,965,800 B2

INTERACTION METHOD IN CALL AND DEVICE

CROSS-REFERENCE TO RELATED APPLICATIONS

This application is a U.S. National Stage of International Patent Application No. PCT/CN2016/082868 filed on May 20, 2016, which is hereby incorporated by reference in its entirety.

TECHNICAL FIELD

Embodiments of the present invention relate to the communications field, and more specifically, to an interaction method in a call and a device.

BACKGROUND

With development of a wearable device, a conventional telephone call function can be implemented on the wearable device. When the wearable device is used to make a service call, a user usually needs to manually enter a digit or a symbol. For example, when dialing a bank service number, the user needs to manually enter a bank card account or a corresponding password. The digit or the symbol manually entered by the user is sent to a call peer end in a dual tone multi frequency (Dual Tone Multi Frequency, DTMF for short) manner. However, a dial pad may not be disposed on the wearable device, and the user cannot select a digit or a symbol of a service phone number; or a screen of the wearable device is quite small, and a misoperation is easily caused when the user enters a digit or a symbol by using the dial pad.

SUMMARY

The present invention provides an interaction method in a call and a device. In a process of making or answering a service call by using a wearable device, under a specific trigger condition, voice information of a user is converted into a dual tone multi frequency tone so as to be sent to a communication peer device. In this way, when the user needs to enter a digit or a symbol in a call process, it can be ensured that the user enters correct information, and user experience is improved.

For ease of understanding embodiments of the present invention, some elements that may be introduced in descriptions of the embodiments of the present invention are described herein first.

A wearable device is a portable device that is directly worn on a body or integrated into clothing or an accessory of a user. The wearable device can implement a powerful function by means of software support, data exchange, or cloud interaction. The wearable device includes but is not limited to a wearable watch, a wearable bracelet, wearable glasses, a wearable mobile phone, a mobile computer, a tablet computer, a personal digital assistant (Personal Digital Assistant, PAD for short), a media player, a smart television, a combination of the foregoing two or more items, or the like.

A dual tone multi frequency (Dual Tone Multi Frequency, DTMF for short) tone includes a high-frequency group and a low-frequency group, and the high-frequency group and the low-frequency group each include four frequencies. By means of superposition, a high-frequency signal and a low-frequency signal form a combined signal, which represents a digit.

A service number is a non-private number, such as 10086, 10010, an after-sales service number, or a service consultation number.

According to a first aspect, an interaction method in a call is provided, where the method is applied to a call scenario of a wearable device and a communication peer device, and the method includes: displaying a voice assistant icon on a call screen of the wearable device when a phone number of the communication peer device is a service number; converting received voice information into a dual tone multi frequency DTMF tone when the voice assistant icon is activated; and sending the DTMF tone to the communication peer device.

Therefore, according to the interaction method in a call in the embodiments of the present invention, in a process of making or answering a service call by using the wearable device, under a specific trigger condition, voice information of a user is converted into a dual tone multi frequency tone so as to be sent to the communication peer device. In this way, when the user needs to enter a digit or a symbol in a call process, it can be ensured that the user enters correct information, and user experience is improved.

With reference to the first aspect, in a first possible implementation of the first aspect, the converting received voice information into a dual tone multi frequency DTMF tone includes: identifying digital information and/or symbol information in the voice information; and converting the digital information and/or the symbol information into the DTMF tone.

With reference to the first possible implementation of the first aspect, in a second possible implementation of the first aspect, the sending the DTMF tone to the communication peer device includes: when it is identified that the voice information includes preset symbol information, sending, to the communication peer device, a DTMF tone corresponding to the digital information and/or the symbol information identified before the preset symbol information.

That is, each time a digit or a symbol is identified in a voice information receiving process, the identified digit or symbol may be converted into a DTMF tone. When a preset symbol is received, the previously converted DTMF tone is sent to the communication peer device. In this way, time for processing information in the call process can be reduced, and user call experience is improved.

With reference to the first possible implementation of the first aspect, in a third possible implementation of the first aspect, the converting the digital information and/or the symbol information into the DTMF tone includes: when it is identified that the voice information includes preset symbol information, converting the digital information and/or the symbol information identified before the preset symbol information into the DTMF tone.

That is, in the voice information receiving process, the identified digit or symbol information may not be converted first. When the preset symbol is received, the digit or the symbol is simultaneously converted into the DTMF tone.

With reference to the first possible implementation of the first aspect, in a fourth possible implementation of the first aspect, the converting the digital information and/or the symbol information into the DTMF tone includes: converting the digital information and/or the symbol information into the DTMF tone when it is not detected that an input time of the voice information exceeds preset duration.

Specifically, a time threshold may be set to detect whether the voice information of the user is completely entered. The time threshold may be set according to an actual requirement, and this is not limited in the present invention.

With reference to the first aspect or any possible implementation of the first to the fourth possible implementations of the first aspect, in a fifth possible implementation of the first aspect, the method further includes: deactivating the voice assistant icon when it is identified that the voice information includes the preset symbol information; and sending, to the communication peer device, voice information received after the voice assistant icon is deactivated.

That is, when the preset symbol is received, the DTMF tone converted before the preset symbol is sent or voice information received before the preset symbol is converted into a DTMF tone by default. Voice information received after the preset symbol is considered as ordinary voice information and is not converted into a DTMF but directly sent to the communication peer device. In this way, the interaction method in a call may be applied to more call scenarios.

With reference to the fifth possible implementation of the first aspect, in a sixth possible implementation of the first aspect, the method further includes: displaying a symbol information icon when the voice assistant is activated, where the deactivating the voice assistant icon includes: deactivating the voice assistant icon when the symbol information icon is activated.

In this way, the user can select a symbol on the symbol information icon to enter the symbol.

With reference to the first aspect or any possible implementation of the first to the sixth possible implementations of the first aspect, in a seventh possible implementation of the first aspect, the method is executed by the wearable device.

Optionally, the method in the first aspect or any possible implementation of the first to the sixth possible implementations of the first aspect may be executed by a wireless terminal connected to the wearable device.

With reference to the seventh possible implementation of the first aspect, in an eighth possible implementation of the first aspect, the wearable device calls the communication peer device by using a wireless terminal device, where the displaying a voice assistant icon on a call screen includes: receiving an indication message sent by the wireless terminal, where the indication message is used to indicate that the phone number of the communication peer device is a service number; and displaying the voice assistant icon on the call screen according to the indication message.

With reference to the seventh possible implementation of the first aspect, in a ninth possible implementation of the first aspect, the wearable device calls the communication peer device by using a wireless terminal device, where the converting received voice information into a dual tone multi frequency DTMF tone when the voice assistant icon is activated, and sending the DTMF tone to the communication peer device includes: when the voice assistant icon is activated, instructing the wireless terminal device to enable a function for converting the voice information into the DTMF tone; and sending the received voice information to the wireless terminal device, so that the wireless terminal device converts the voice information into the DTMF tone, and sending the DTMF tone to the communication peer device.

According to a second aspect, an interaction method in a call is provided, where the method is applied to a call scenario of a wearable device and a communication peer device, and the method includes: when a phone number of the communication peer device is a service number, detecting whether a function key is triggered; converting received voice information into a dual tone multi frequency DTMF tone when the function key is triggered; and sending the DTMF tone to the communication peer device.

Therefore, according to the interaction method in a call in the embodiments of the present invention, in a process of making or answering a service call by using the wearable device, under a specific trigger condition, voice information of a user is converted into a dual tone multi frequency tone so as to be sent to the communication peer device. In this way, when the user needs to enter a digit or a symbol in a call process, it can be ensured that the user enters correct information, and user experience is improved.

With reference to the second aspect, in a first possible implementation of the second aspect, if the function key is triggered when the phone number of the communication peer device is not a service number, the wearable device executes a function corresponding to the function key, where the function corresponding to the function key is not a function for converting the received voice information into the DTMF tone.

With reference to the second aspect or the first possible implementation of the second aspect, in a second possible implementation of the first aspect, when the phone number of the communication peer device is a service number, the method further includes: prompting a user to trigger the function key, to enable the function for converting the received voice information into the DTMF tone.

It should be noted that an implementation for converting the received voice information into the DTMF tone in the second aspect or any possible implementation of the second aspect is the same as the implementation described in the possible implementations of the first aspect, and an implementation for sending the DTMF tone to the communication peer device in the second aspect or any possible implementation of the second aspect is the same as the implementation described in the possible implementations of the first aspect. To avoid repetition, details are not described herein again.

According to a third aspect, an interaction method in a call is provided, where the method is applied to a call scenario of a wearable device and a communication peer device, and the method includes: detecting gesture input when a phone number of the communication peer device is a service number; converting received voice information into a dual tone multi frequency DTMF tone when the gesture input is a preset gesture; and sending the DTMF tone to the communication peer device.

Therefore, according to the interaction method in a call in the embodiments of the present invention, in a process of making or answering a service call by using the wearable device, under a specific trigger condition, voice information of a user is converted into a dual tone multi frequency tone so as to be sent to the communication peer device. In this way, when the user needs to enter a digit or a symbol in a call process, it can be ensured that the user enters correct information, and user experience is improved.

Optionally, when the phone number of the communication peer device is a service number, the user is prompted to enter the preset gesture, to trigger to enable a function for converting the received voice information into the DTMF tone.

According to a fourth aspect, an interaction method in a call is provided, where the method is applied to a call scenario of a wearable device and a communication peer device, and the method includes: when a number type of a phone number of the communication peer device is a service number, displaying, on the wearable device, icons corresponding to a digit and a symbol, where the digit includes 0 to 9, and the symbol includes * and #; and when the icon is entered, sending a dual tone multi frequency DTMF tone corresponding to the icon to the communication peer device, where at least some of the icons are simultaneously displayed on a display screen of the wearable device, and the icons roll in two directions based on an operation of a rolling apparatus.

Therefore, according to the interaction method in a call in the embodiments of the present invention, in a process of making or answering a service call by using the wearable device, the digit and the symbol are displayed in a rolling manner on the display screen of the wearable device. In this way, when a user needs to enter a digit or a symbol in a call process, it can be ensured that the user enters correct information, and user experience is improved.

With reference to the fourth aspect, in a first possible implementation of the fourth aspect, an icon corresponding to the symbol is always displayed on the display screen.

That the icons roll in the two directions based on the operation of the rolling apparatus includes:

an icon corresponding to the digit rolls in the two directions based on the operation of the rolling apparatus.

Optionally, the icon corresponding to the symbol may be fixedly displayed on two sides or a top or a bottom or one side of a digit rolling window. In this way, the icon corresponding to the digit is big enough, and an input error is avoided.

With reference to the fourth aspect or the first possible implementation of the fourth aspect, in a second possible implementation of the fourth aspect, the rolling apparatus is a touchscreen or a direction key.

According to a fifth aspect, a device is provided, configured to execute the method in the first aspect or any possible implementation of the first aspect. Specifically, the device includes a unit configured to execute the method in the first aspect or any possible implementation of the first aspect.

According to a sixth aspect, a device is provided. A wearable device calls a communication peer device by using the device, and the device is configured to execute the method in the second aspect or any possible implementation of the second aspect. Specifically, the device includes a unit configured to execute the method in the second aspect or any possible implementation of the second aspect.

According to a seventh aspect, a device is provided, configured to execute the method in the third aspect. Specifically, the device includes a unit configured to execute the method in the third aspect.

According to an eighth aspect, a device is provided, configured to execute the method in the fourth aspect or any possible implementation of the fourth aspect. Specifically, the device includes a unit configured to execute the method in the fourth aspect or any possible implementation of the fourth aspect.

According to a ninth aspect, a device is provided, including a processor, a memory, and a transceiver, where the processor, the memory, and the transceiver are connected by using a bus system. The memory is configured to store an instruction; the transceiver receives and sends a message according to control of the processor, to implement communication between the device and a communication peer device; and the processor is configured to invoke the instruction stored in the memory to execute the method in the first aspect or any possible implementation of the first aspect.

According to a tenth aspect, a device is provided, including a processor, a memory, and a transceiver, where the processor, the memory, and the transceiver are connected by using a bus system. The memory is configured to store an instruction; the transceiver receives and sends a message according to control of the processor, to implement communication between the device and a communication peer device; and the processor is configured to invoke the instruction stored in the memory to execute the method in the second aspect or any possible implementation of the second aspect.

According to an eleventh aspect, a device is provided, including a processor, a memory, and a transceiver, where the processor, the memory, and the transceiver are connected by using a bus system. The memory is configured to store an instruction; the transceiver receives and sends a message according to control of the processor, to implement communication between the device and a communication peer device; and the processor is configured to invoke the instruction stored in the memory to execute the method in the third aspect.

According to a twelfth aspect, a device is provided, including a processor, a memory, and a transceiver, where the processor, the memory, and the transceiver are connected by using a bus system. The memory is configured to store an instruction; the transceiver receives and sends a message according to control of the processor, to implement communication between the device and a communication peer device; and the processor is configured to invoke the instruction stored in the memory to execute the method in the fourth aspect or any possible implementation of the fourth aspect.

According to a thirteenth aspect, a computer readable medium is provided, configured to store a computer program, where the computer program includes an instruction used to execute the method in the first aspect or any possible implementation of the first aspect.

According to a fourteenth aspect, a computer readable medium is provided, configured to store a computer program, where the computer program includes an instruction used to execute the method in the second aspect or any possible implementation of the second aspect.

According to a fifteenth aspect, a computer readable medium is provided, configured to store a computer program, where the computer program includes an instruction used to execute the method in the third aspect.

According to a sixteenth aspect, a computer readable medium is provided, configured to store a computer program, where the computer program includes an instruction used to execute the method in the fourth aspect or any possible implementation of the fourth aspect.

BRIEF DESCRIPTION OF DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly and completely describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

Figure 1:
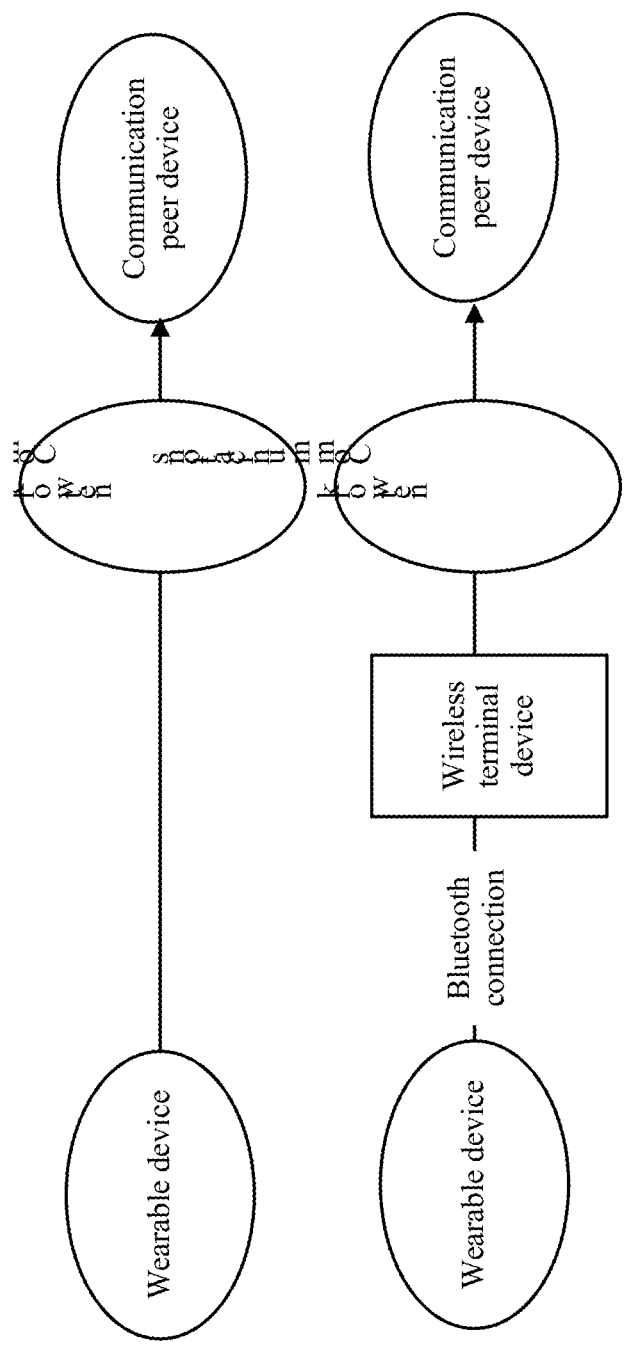
FIG. 1 is a schematic diagram of an application scenario according to an embodiment of the present invention.

FIG. 1 shows an application scenario of the embodiments of the present invention. As shown in FIG. 1, a method in the embodiments of the present invention may be applied to a scenario (as shown in an upper figure in FIG. 1) in which a wearable device (for example, a smartwatch) communicates with a communication peer device by directly accessing a communications network, or may be applied to a scenario (as shown in a lower figure in FIG. 1) in which a wearable device communicates with a communication peer device by accessing a communications network by using a wireless terminal device.

In FIG. 1, the wireless terminal device may be a mobile phone. The wearable device and the wireless terminal device may be paired and connected by using Bluetooth. The communication peer device may be a device such as a smartwatch or a mobile phone, or may be a public service platform device. When a service call is made or answered by using the wearable device, a digit or a symbol usually needs to be entered in the wearable device to select a service type. However, currently, a screen of the wearable device is relatively small, and a dial pad is usually not disposed; consequently, a user cannot enter a digit or a symbol by using the dial pad. Although the dial pad is disposed in the current wearable device, the dial pad is relatively small, and an input error is easily caused by the user.

Based on this, in a process of making or answering a service call by using a wearable device, under a specific trigger condition, a method for converting voice information of a user into a dual tone multi frequency tone so as to be sent to a communication peer device may be provided, to prevent the user from entering incorrect information.

An example in which a wearable device is a smartwatch and a wireless terminal is a mobile phone is used to describe the method in the embodiments of the present invention in detail below. It should be understood that the example of the smartwatch and the mobile phone is merely for ease of description and does not constitute a limitation on the protection scope of the embodiments of the present invention.

Figure 2:
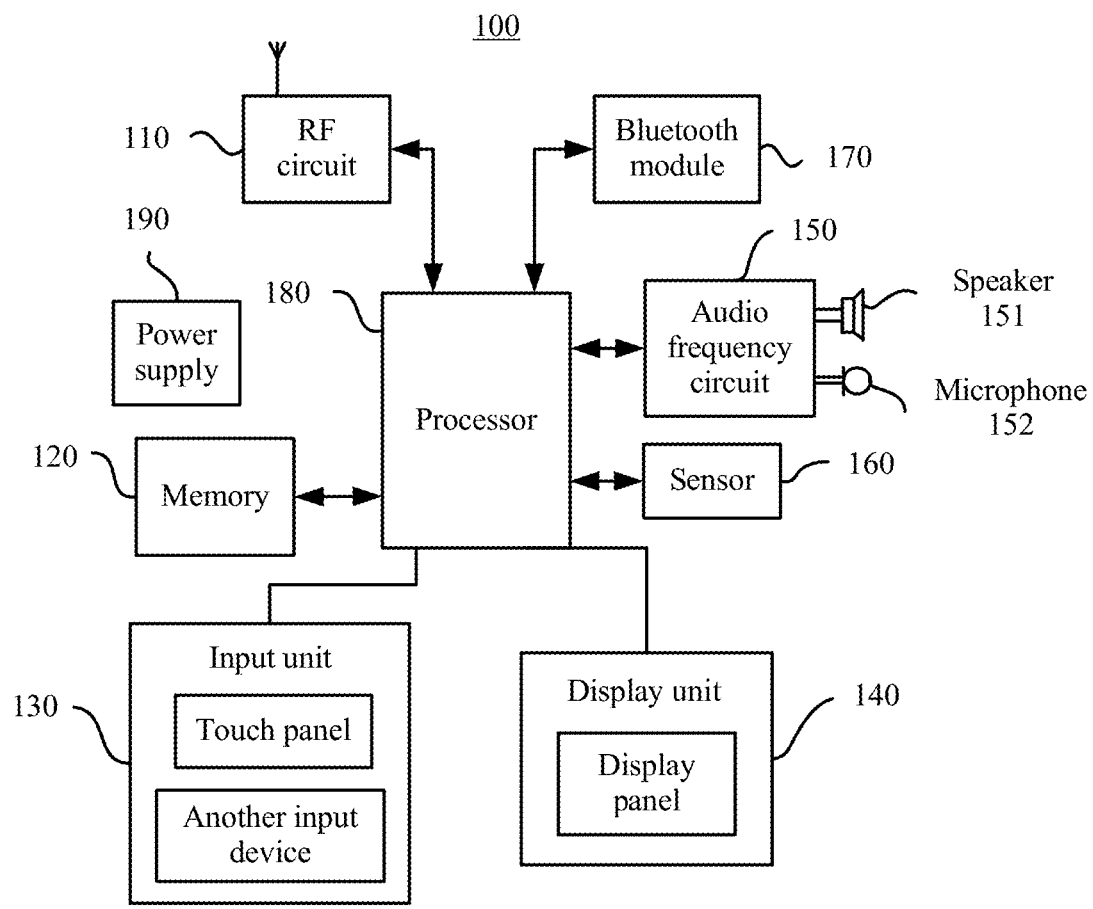
FIG. 2 is a schematic block diagram of a smartwatch according to an embodiment of the present invention.

FIG. 2 shows a block diagram of a partial structure of a smartwatch 100 related to an embodiment of the present invention. Referring to FIG. 2, the smartwatch 100 includes components such as a radio frequency (Radio Frequency, RF for short) circuit 110, a memory 120, an input unit 130, a display unit 140, an audio frequency circuit 150, a speaker 151, a microphone 152, a sensor 160, a Bluetooth module 170, a processor 180, and a power supply 190. A person skilled in the art may understand that the structure of the smartwatch shown in FIG. 1 does not constitute a limitation on the smartwatch, and the smartwatch may include components more or fewer than those shown in the figure, or may combine some components, or have different component arrangements.

For example, the smartwatch 100 may further include a camera, a Wireless Fidelity (Wireless Fidelity, WiFi for short) module, or the like. Details are not described herein.

Figure 3:
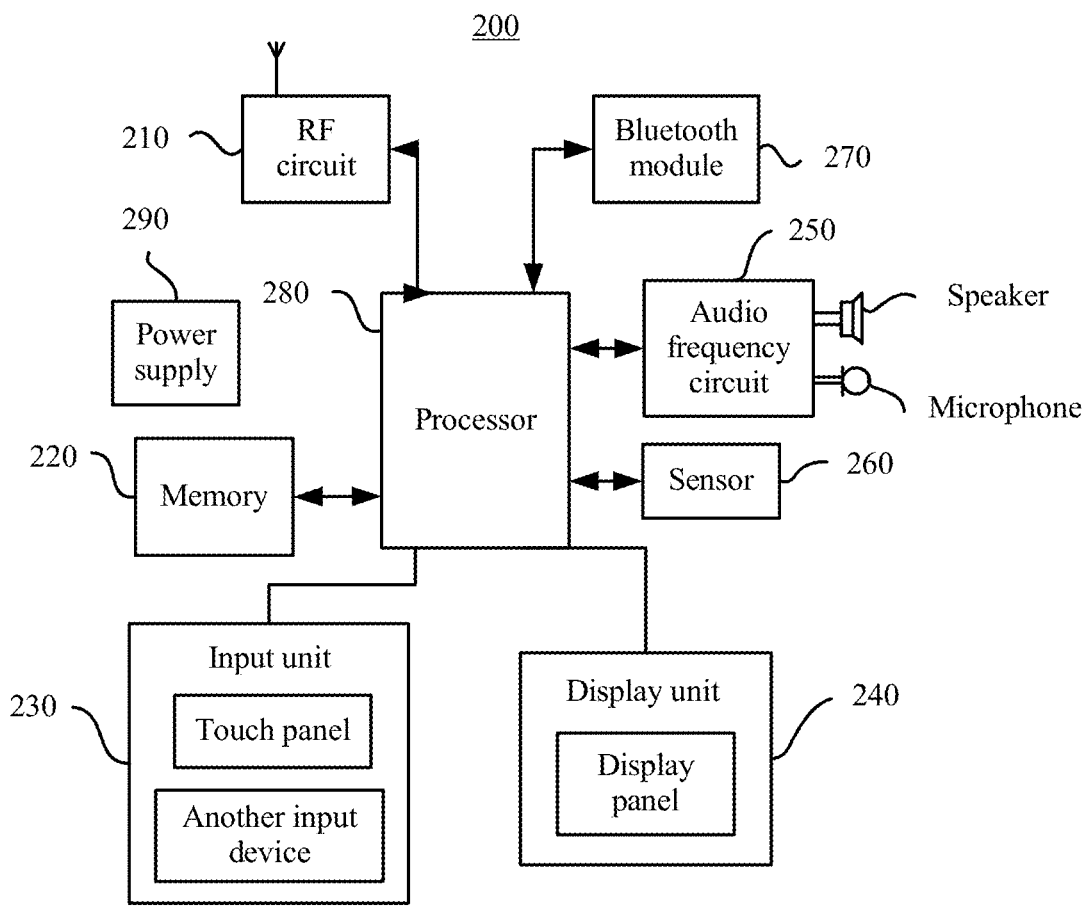
FIG. 3 is a schematic block diagram of a mobile phone according to an embodiment of the present invention.

FIG. 3 shows a block diagram of a partial structure of a mobile phone related to an embodiment of the present invention. Referring to FIG. 3, a mobile phone 200 includes components such as a radio frequency (Radio Frequency, RF for short) circuit 210, a memory 220, an input unit 230, a display unit 240, an audio frequency circuit 250, a sensor 260, a Bluetooth module 270, a processor 280, and a power supply 290. A person skilled in the art may understand that the structure of the mobile phone shown in FIG. 2 does not constitute a limitation on the mobile phone, and the mobile phone may include components more or fewer than those shown in the figure, or may combine some components, or have different component arrangements.

For example, the mobile phone may further include a camera, a Wireless Fidelity (Wireless Fidelity, WiFi for short) module, or the like. Details are not described herein.

In this embodiment of the present invention, the RF circuit may be configured to: receive and send information, or receive and send a signal in a call process; in particular, after receiving downlink information of a base station, send the downlink information to the processor for processing; and in addition, send uplink data to the base station. Generally, the RF circuit includes but is not limited to an antenna, at least one amplifier, a transceiver, a coupler, a low noise amplifier (Low Noise Amplifier, LNA for short), a duplexer, and the like. In addition, the RF circuit may further communicate with a network and another device by means of wireless communication. The wireless communication may use any communications standard or protocol, including but not limited to a GSM, a GPRS, CDMA, WCDMA, LTE, an email, a short messaging service (Short Messaging Service, SMS for short), or the like.

The memory may be configured to store a software program and a module. By running the software program and the module stored in the memory, the processor executes various function applications of the smartwatch 100 or the mobile phone 200 and performs data processing. The memory may mainly include a program storage area and a data storage area. The program storage area may store an operating system, an application program required for at least one function (such as a sound playback function or an image playback function), or the like. The data storage area may store data (such as audio data or a phone book) created according to use of the smartwatch 100 or the mobile phone 200, or the like. In addition, the memory may include a high-speed random access memory, and may further include a nonvolatile memory such as at least one magnetic disk storage component, a flash memory component, or another volatile solid-state storage component.

The input unit may be configured to receive entered digital or character information, and generate key signal input related to user setting and function control of the smartwatch 100 or the mobile phone 200. Specifically, the input unit may include a touch panel and another input device. The touch panel, also referred to as a touchscreen, may collect a touch operation (such as an operation performed by a user on the touch panel or near the touch panel by using any proper object or accessory, such as a finger or a stylus) of the user on or near the touch panel, and drive a corresponding connection apparatus according to a preset program. Optionally, the touch panel may include two parts: a touch detection apparatus and a touch controller. The touch detection apparatus detects a touch position of the user, detects a signal brought by the touch operation, and sends the signal to the touch controller. The touch controller receives touch information from the touch detection apparatus, converts the touch information into touch point coordinates, sends the touch point coordinates to the processor, and can receive and execute a command sent by the processor. In addition, the touch panel may be implemented in multiple types, such as a resistive type, a capacitive type, infrared, and a surface acoustic wave. The input unit may further include the another input device in addition to the touch panel. Specifically, the another input device may include but is not limited to one or more of a physical keyboard, a function key (such as a volume control key or an on/off key), a trackball, a mouse, a joystick, or the like.

The display unit may be configured to display information that is entered by the user or information provided for the user, and various menus of the device. The display unit may include a display panel. Optionally, the display panel may be configured in a form such as a liquid crystal display (Liquid Crystal Display, LCD for short) or an organic light-emitting diode (Organic Light-Emitting Diode, OLED for short). Further, the touch panel may cover the display panel. When detecting the touch operation on or near the touch panel, the touch panel sends the touch operation to the processor to determine a type of a touch event, and then the processor provides corresponding visual output on the display panel according to the type of the touch event. In FIG. 1 or FIG. 2, the touch panel and the display panel are used as two independent components to implement input and output functions of the smartwatch 100 or the mobile phone 200; however, in some embodiments, the touch panel and the display panel may be integrated to implement the input and output functions of the smartwatch 100 or the mobile phone 200.

The audio frequency circuit, the speaker, and the microphone may provide an audio interface between the user and the smartwatch 100. The audio frequency circuit may convert received audio data into an electrical signal, and transmit the electrical signal to the speaker, and the speaker converts the electrical signal into a sound signal for outputting. In addition, the microphone converts a collected sound signal into an electrical signal, and the audio frequency circuit receives the electrical signal, converts the electrical signal into audio data, and then outputs the audio data to the memory for further processing.

The processor is a control center of the smartwatch 100 or the mobile phone 200, uses various interfaces and lines to connect all parts of the entire mobile phone, and executes various functions of the smartwatch 100 or the mobile phone 200 and processes data by running or executing the software program and/or the module stored in the memory and invoking data stored in the memory, so as to perform overall monitoring on the device. Optionally, the processor may include one or more processing units. Preferably, the processor may be integrated with an application processor and a modem processor. The application processor mainly processes an operating system, a user interface, an application program, and the like; and the modem processor mainly processes wireless communication. It may be understood that the foregoing modem processor may be not integrated into the processor.

The power supply (such as a battery) is configured to supply power to each part. Preferably, the power supply may be logically connected to the processor by using a power management system, so that functions such as charging and discharging management and power consumption management are implemented by using the power management system.

Figure 4:
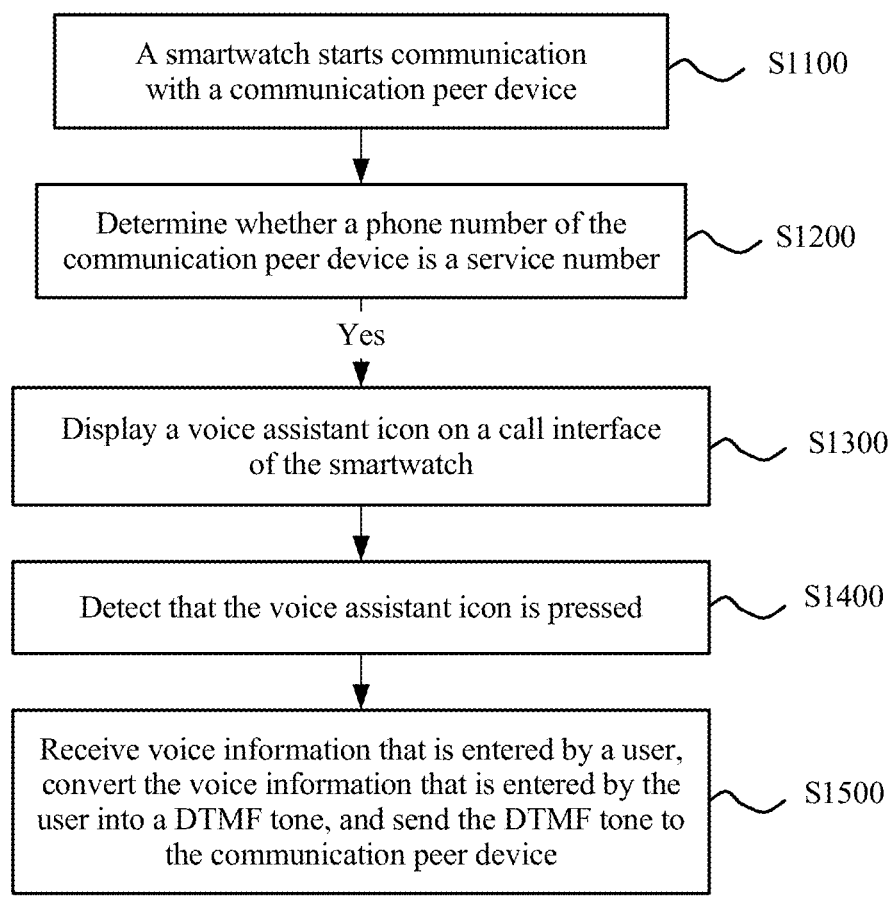
FIG. 4 is a schematic flowchart of an interaction method in a call according to an embodiment of the present invention.

A schematic flowchart of an interaction method in a call according to an embodiment of the present invention is described below with reference to the smartwatch 100 shown in FIG. 2 and the mobile phone 200 shown in FIG. 3. As shown in FIG. 4, a method 1000 includes the following steps.

S1100. The smartwatch 100 starts communication with a communication peer device.

Optionally, the smartwatch 100 initiates a call according to an instruction of a user, or receives a call from the communication peer device.

Optionally, the user may enable a voice control function (such as Siri) in the smartwatch 100 and send a voice signal to the smartwatch 100 by using the microphone 152, for example, the user enters "call Xiaoming" by using the microphone 152. The microphone 152 converts a sound signal that is entered by the user into an electrical signal and sends the electrical signal to the audio frequency circuit 150, the audio frequency circuit 150 converts the electrical signal into audio data and outputs the audio data to the memory 120, and the processor 180 finds, by querying a phone book stored in the memory 120, a phone number corresponding to the audio data. The user may also enter a friend list of the user by using a shortcut key on the smartwatch 100, and find, in the friend list, a target friend who needs to be called.

If the smartwatch 100 can communicate with the communication peer device by directly accessing a communications network, the processor 180 invokes, after finding a phone number that needs to be dialed, the RF circuit 110 in the smartwatch 100 to make a call. Alternatively, when the user presses a call button, the smartwatch 100 invokes the RF circuit 110 to make a call.

If the smartwatch 100 cannot communicate with the communication peer device by directly accessing the communications network, before a call is made, the smartwatch 100 is paired with and connected to the mobile phone 200 by using the Bluetooth module 170. The mobile phone 200 accesses the communications network. When a call is made, after finding the phone number that needs to be dialed, the processor 180 in the smartwatch 100 notifies, by means of Bluetooth connection, the mobile phone 200 of the phone number that needs to be dialed, and the mobile phone 200 makes the call by using the RF circuit 210. Alternatively, when the user presses the call button, the smartwatch 100 notifies, by means of Bluetooth connection, the mobile phone 200 of the phone number that needs to be dialed, and the mobile phone 200 makes a call by using the RF circuit 210.

The call from the communication peer device may be directly processed by the smartwatch 100, for example, the call is received by using the RF circuit 110, and the user may answer the call by operating a touchscreen or by means of voice control. Alternatively, the mobile phone 200 processes the call from the communication peer device, establishes a communication connection to the communication peer device, and transfers an instruction and call information by using the Bluetooth module 270 and the smartwatch 100.

S1200. Determine whether a phone number of the communication peer device is a service number.

The service number is a non-private number and may be a service consultation number of a company or an institution, such as the China Mobile service number 10086, the China Telecom service number 10000, an after-sales service number, or a service consultation number.

The memory 120 in the smartwatch 100 pre-stores a service number list. When a call is made, the processor 180 in the smartwatch 100 may determine, by means of local querying, whether the phone number of the communication peer device is a service number. The processor 180 in the smartwatch 100 may also obtain a service number directory or rule in advance, and perform local querying according to the obtained service number directory or rule, to determine whether the phone number of the communication peer device is a service number. The smartwatch 100 may also perform querying by interacting with a cloud server by using the RF circuit 110.

Alternatively, the smartwatch 100 and the mobile phone 200 are paired and connected in a Bluetooth manner. When a call is made, the smartwatch 100 sends the phone number of the communication peer device to the mobile phone 200 by using the Bluetooth module 170, and the processor 280 in the mobile phone 200 determines whether the phone number of the communication peer device is a service number. After determining a result, the processor 280 in the mobile phone 200 may indicate, by sending indication information to the Bluetooth module 170 in the smartwatch 100 by using the Bluetooth module 260, the smartwatch 100 whether the phone number of the communication peer device is a service number. Specifically, the memory 220 in the mobile phone 200 pre-stores the service number list. After receiving the phone number of the communication peer device sent by the smartwatch 100, the processor 280 may determine, by means of local querying, whether the phone number of the communication peer device is a service number. The processor 280 may also obtain the service number directory or rule in advance. After the mobile phone 200 receives the phone number of the communication peer device sent by the smartwatch 100, the processor 280 performs local querying according to the obtained service number directory or rule, to determine whether the phone number of the communication peer device of the user is a service number. The mobile phone 100 may also perform querying by interacting with the cloud server by using the RF circuit 210.

S1300. If the phone number of the communication peer device is a service number, display a voice assistant icon on a call screen of the smartwatch 100.

Figure 5:
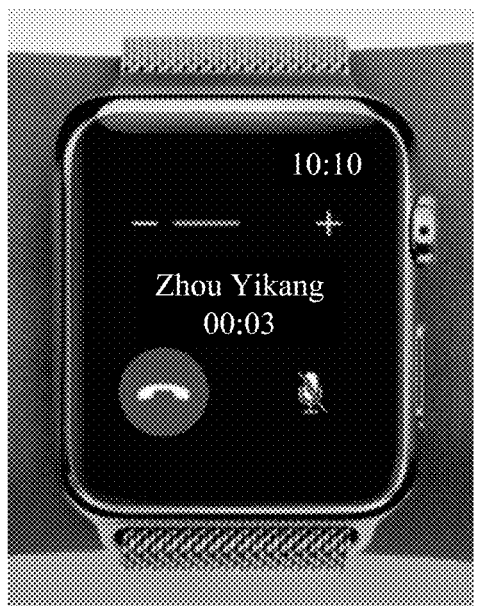
FIG. 5 is a schematic diagram of a call screen of a smartwatch in a call process in the prior art.

Generally, as shown in FIG. 5, because a display screen of the smartwatch is relatively small, there are only options such as sound adjustment, ending a call, and mute on a current call screen, and a requirement for entering a digit or a symbol by using a virtual keyboard on the smartwatch when the user is making or answering a service call cannot be met. After the voice assistant icon is added to the current call screen, the user can press the voice assistant icon for voice entering when a digit or a symbol needs to be entered in voice.

If in S1200, the processor 180 in the smartwatch 100 determines that the phone number of the communication peer device is a service number, the smartwatch 100 automatically adds the voice assistant icon to the display unit 140. If in S1200, the mobile phone 200 connected to the smartwatch 100 determines that the phone number of the communication peer device is a service number, the mobile phone 200 sends the indication information to the Bluetooth module 170 in the smartwatch 100 by using the Bluetooth module 270. The indication information instructs the smartwatch 100 to add the voice assistant icon to the display unit 140, and optionally, the indication information further indicates a function of the voice assistant icon. After receiving the indication information, the Bluetooth module 170 in the smartwatch 100 sends the indication information to the processor 180, so that the processor 180 displays the generated voice assistant icon on the display unit 140 according to a requirement of the indication information.

S1400. Detect that the voice assistant icon is pressed.

When needing to enter a digit or a symbol, the user presses the voice assistant icon on the display unit 140 in the smartwatch 100, that is, the voice assistant icon is activated. If the user presses the voice assistant icon again (that is, the voice assistant icon is deactivated), a function for converting voice information into a DTMF tone is disabled. That is, voice information that is entered by the user at this time is not converted into a DTMF tone but sent to the communication peer device after normal processing, so that the communication peer device receives the voice information of the user.

S1500. Receive voice information that is entered by a user, convert the voice information that is entered by the user into a dual tone multi frequency (Dual Tone Multi Frequency, DTMF for short) tone, and send the DTMF tone to the communication peer device.

After the user presses the voice assistant icon on the display unit 140 in the smartwatch 100, the microphone 152 in the smartwatch 100 collects the voice information that is entered by the user. The voice information that is entered by the user usually needs to include a digit and/or a symbol, and optionally, the symbol may be "#" or "*".

Optionally, for example, after the microphone 152 in the smartwatch 100 collects the voice information that is entered by the user, the audio frequency circuit 150 sends the voice information to the processor 180. The processor 180 converts the voice information that is entered by the user into text information, and converts the text information into a DTMF tone so as to be sent to the communication peer device. For example, the user enters "1" in voice. The processor 180 converts the voice into text "1", and converts the text "1" into a DTMF tone corresponding to "1" so as to be sent to the communication peer device. Specifically, the smartwatch 100 may pre-store a correspondence between a digit or a symbol and a DTMF tone, and when conversion is performed, search for, in a mapping relationship, a DTMF tone corresponding to a digit or a symbol.

Optionally, for example, after collecting the voice information that is entered by the user, the microphone 152 in the smartwatch 100 outputs the voice information to the Bluetooth module 170, to send the voice information to the Bluetooth module 270 in the mobile phone 200. After the Bluetooth module 270 in the mobile phone 200 receives the voice information sent by the smartwatch 100, the audio frequency circuit 250 sends the voice information to the processor 280. The processor 280 converts the voice information into text information, and converts the text information into a DTMF tone so as to be sent to the communication peer device. Specifically, the mobile phone 200 may pre-store a correspondence between a digit or a symbol and a DTMF tone, and when conversion is performed, search for, in a mapping relationship, a DTMF tone corresponding to a digit or a symbol.

Optionally, for example, after the microphone 152 in the smartwatch 100 collects the voice information that is entered by the user, the processor 180 converts the voice information that is entered by the user into text information, and sends the text information to the mobile phone 200. The processor 280 in the mobile phone 200 converts the text information into a DTMF tone so as to be sent to the communication peer device.

Specifically, when the user enters a digit or a symbol, the smartwatch 100 sends a DTMF tone corresponding to the digit or the symbol to the communication peer device. The DTMF tone is a combined signal, and the combined signal is formed by superposing a high-frequency signal and a low-frequency signal. For example, if the user enters a digit 4, the smartwatch 100 sends, to the communication peer device, a combined signal formed by superposing a 770 Hz signal and a 1209 Hz signal.

Optionally, for example, in a process of converting the voice information into the DTMF tone so as to be sent to the communication peer device, when converting the voice information into text information, each time a digit or a symbol is obtained by means of conversion, the smartwatch 100 or the mobile phone 200 may convert the digit or the symbol into a DTMF tone and cache the DTMF tone obtained by means of conversion. When a preset symbol appears in the text information, the DTMF tone previously obtained by means of conversion is sent in a voice input sequence. For example, if the user needs to enter an identity card number in a call process, and the identity card number of the user is "123456", in a process of entering "123456" in voice by the user, digits may be converted into DTMF tones one by one according to a user input sequence. When the user enters "#" ("#" is the preset symbol), the previously converted DTMF tones are sent to the communication peer device in the voice input sequence. Optionally, for example, each time a DTMF tone is obtained by means of conversion, the DTMF tone may be sent to the communication peer device, instead of being sent when the preset symbol appears.

Alternatively, in a process of converting the voice information that is entered by the user into the DTMF tone so as to be sent to the communication peer device, voice input of the user may be converted into text information. When the user enters the preset symbol, a digit or a symbol in the text information obtained by means of conversion before the preset symbol is converted into the DTMF tone in an input sequence so as to be sent to the communication peer device. The foregoing example in which the user enters the identity card number is used. When it is detected that the user enters "#", "123456" that is previously entered by the user is converted into the DTMF tone so as to be sent to the call peer end.

Optionally, the user may enter the preset symbol in voice, or the display unit 140 in the smartwatch 100 may display a symbol information icon, and the user may manually select a to-be-entered symbol from the symbol information icon on the display unit 140 in the smartwatch 100, so as to enter the symbol. The symbol information icon may be displayed on the display unit in the smartwatch when the voice assistant icon is pressed (activated), and further, may disappear from the display unit 140 in the smartwatch 100 when the voice assistant icon is pressed again (deactivated).

In the foregoing solution, optionally, the preset symbol that is entered by the user is also converted into a corresponding DTMF tone so as to be sent to the communication peer device, to notify the communication peer device that entering is completed.

In the foregoing solution, optionally, after the user enters the preset symbol, it is considered that this entering is finished. When the user enters voice information again, a digit or a symbol thereof is regarded as next entering. For example, in a process of making a service call, the user needs to enter a bank card number and finish bank card number entering by using "#", and at this time, the user may continue, according to a service call prompt, to enter a password and finish password entering by using "#". Therefore, the first "#" represents that the first entering is completed, and subsequent entering is next entering.

Optionally, after the user enters the preset symbol, the function for converting voice information into a DTMF tone is disabled. That is, if voice information continues to be entered after the preset symbol, in this case, the subsequently entered voice information is not converted into a DTMF tone, and the subsequently entered voice information is directly sent to the communication peer device. For example, in a process of making a service call, the user selects a human service to perform voice communication with a person. In a process of performing voice communication with the person, the user needs to enter the identity card number and finishes entering by using "#". At this time, the user resumes voice communication with the communication peer device after entering "#". Therefore, voice information that is entered by the user after "#" is entered does not need to be converted into a DTMF tone. During specific implementation, the foregoing method embodiment may further include: when it is detected that the user enters the preset symbol, disabling the function for converting voice information into a DTMF tone, and deactivating the voice assistant icon, that is, the voice assistant icon is pressed again. In this way, when the voice assistant icon is deactivated, the communication peer device can receive the voice information of the user. When needing to enter a digit or a symbol again, the user may press the voice assistant icon again to activate the voice assistant icon.

Optionally, for example, a time threshold may be preset to detect whether the user completes entering the voice information. For example, the time threshold is 5 s. If after the user enters a segment of voice, no voice is entered again within 5 s, it is considered that the user completes entering the voice information. In this case, the voice information that is entered by the user is converted into a DTMF tone, and the DTMF tone is sent to the communication peer device.

Figure 6:
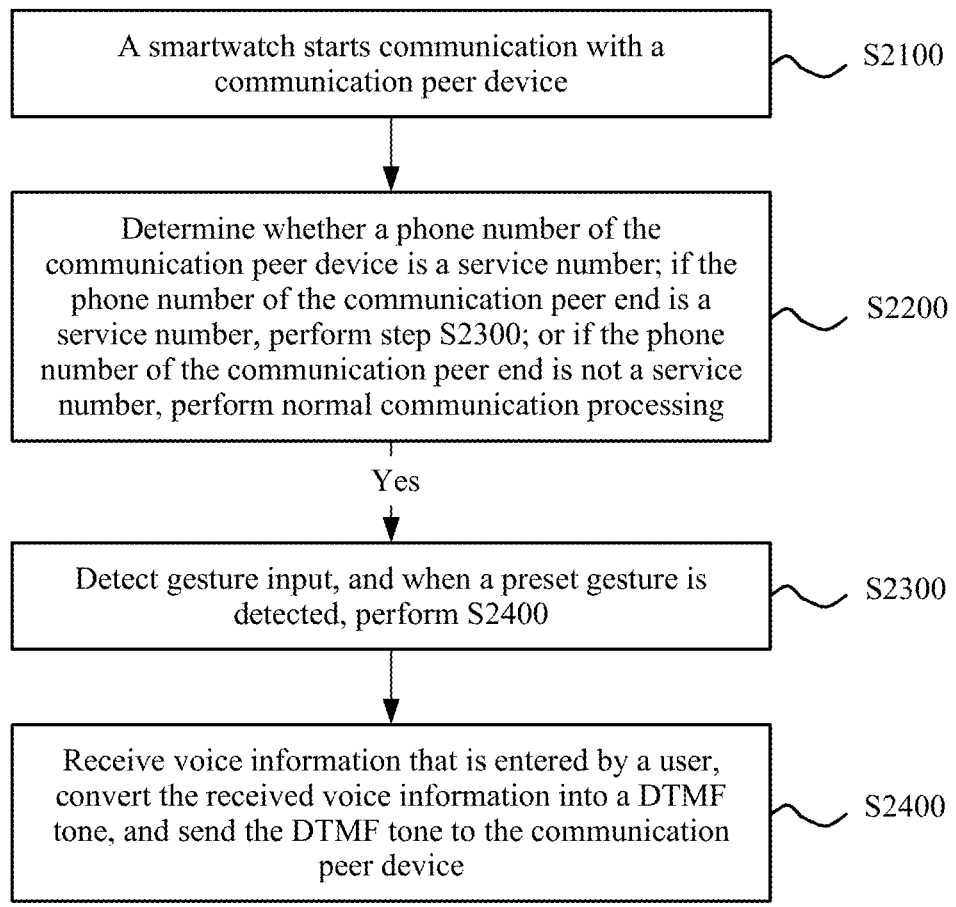
FIG. 6 is a schematic flowchart of an interaction method in a call according to another embodiment of the present invention.

FIG. 6 shows a schematic flowchart of an interaction method in a call according to another embodiment of the present invention. As shown in FIG. 6, a method 2000 includes the following steps.

S2100. A smartwatch 100 starts communication with a communication peer device.

S2200. Determine whether a phone number of the communication peer device is a service number; if the phone number of the communication peer end is a service number, perform step S2300; or if the phone number of the communication peer end is not a service number, perform normal communication processing.

A specific implementation of S2100 is the same as that of S1100, and a specific implementation of S2200 is the same as that of S1200. To avoid repetition, details are not described herein again.

S2300. Detect gesture input, and when a preset gesture is detected, perform step S2400.

Optionally, for example, if the phone number of the communication peer device is a service number, the smartwatch 100 enables a gesture detection function and detects, by using a sensor 160, whether there is gesture input of a user in a call process.

Optionally, for example, if in S2200, a mobile phone 200 connected to the smartwatch 100 determines that the phone number of the communication peer device is a service number, the mobile phone 200 enables a gesture detection function, and detects, by using a sensor 260, whether there is gesture input of a user in a call process. If the sensor 260 detects the gesture input of the user, the sensor 260 sends, to a Bluetooth module 170 in the smartwatch 100 by using a Bluetooth module 270, a gesture that is entered by the user.

The sensor 160 and the sensor 260 may be light sensors, proximity sensors, or the like, and may be configured to detect that the user is approaching or leaving the sensor.

The gesture input may also be detected by using a touchscreen.

Optionally, for example, a memory 120 in the smartwatch 100 pre-stores a preset gesture, and the preset gesture may be a gesture built in a system when the smartwatch 100 is delivered from a factory or may be a gesture preset by the user. When detecting the gesture input of the user or receiving the gesture that is entered by the user and that is sent by the watch 200, the smartwatch 100 determines, by means of local querying, whether the gesture that is entered by the user is the preset gesture, or the smartwatch 100 performs querying by interacting with a cloud server by using an RF circuit 110, to determine whether the gesture that is entered by the user is the preset gesture.

Optionally, for example, in S2200, after detecting the gesture input of the user, the mobile phone 200 connected to the smartwatch 100 may determine whether the gesture that is entered by the user is a preset gesture, and send indication information to the smartwatch 100 by using the Bluetooth module 270. The indication information indicates whether the gesture that is entered by the user is the preset gesture, and the smartwatch 100 determines, according to the indication information, whether the gesture that is entered by the user is the preset gesture.

Optionally, for example, if the phone number of the communication peer device is a service number, the smartwatch 100 may prompt, by using a speaker 151 or in a manner of a prompt box on a display unit 140, the user to enter the preset gesture, to enable a function for converting voice information into a DTMF tone.

S2400. Receive voice information that is entered by a user, convert the received voice information into a DTMF tone, and send the DTMF tone to the communication peer device.

It should be noted that a specific implementation for converting the received voice information into the DTMF tone in S2400 is the same as a specific implementation for converting received voice information into a DTMF tone in S1500. Details are not described herein again.

In the foregoing embodiment, S2300 may also be replaced with: detecting whether a function key is triggered, and performing S2400 when the function key is triggered.

Figure 7:
FIG. 7 is a schematic structural diagram of a digital crown of a smartwatch.

Optionally, for example, detecting that the gesture input is the preset gesture may be detecting a gesture for triggering the function key on the smartwatch 100. A function of the function key is different when the phone number of the communication peer device is a service number and is not a service number. A digital crown on a smartwatch in FIG. 7 is used as an example. When the phone number of the communication peer device is not a service number, a voice control function (such as Siri) may be invoked by holding down the digital crown. When the phone number of the communication peer device is a service number, the function for converting received voice information into a DTMF tone may be enabled by holding down the digital crown.

Figure 8:
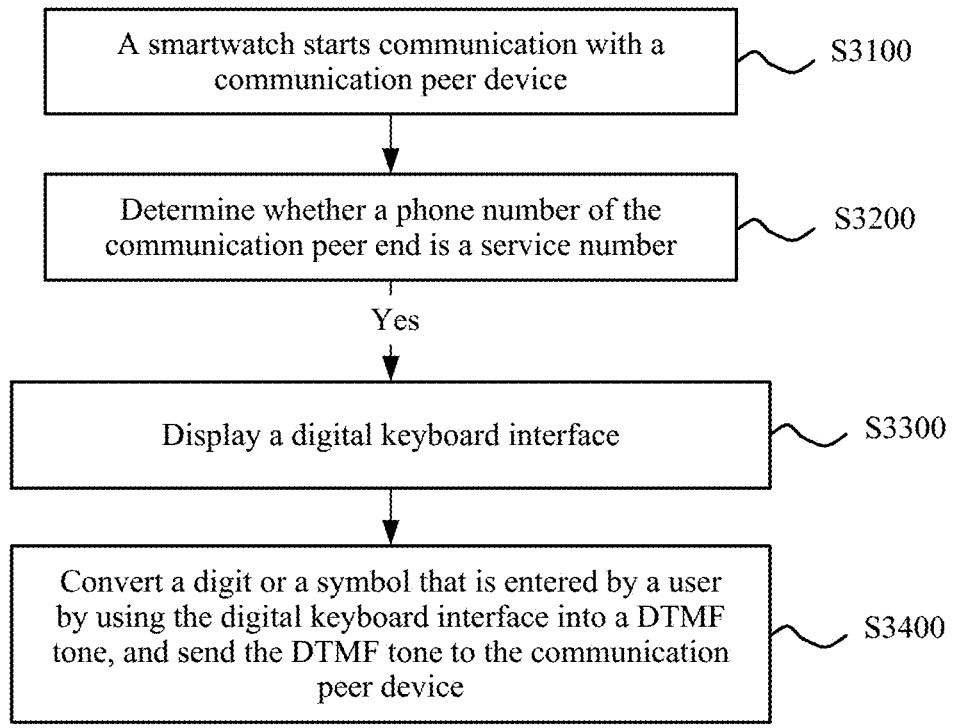
FIG. 8 is a schematic flowchart of an interaction method in a call according to still another embodiment of the present invention.

FIG. 8 shows a schematic flowchart of an interaction method in a call according to still another embodiment of the present invention. As shown in FIG. 8, a method 3000 includes the following steps.

S3100. A smartwatch 100 starts communication with a communication peer device.

S3200. Determine whether a phone number of the communication peer device is a service number.

A specific implementation of S3100 is the same as that of S1100, and a specific implementation of S3200 is the same as that of S1200. Details are not described herein again.

S3300. If the phone number of the communication peer device is a service number, display a digital keyboard screen.

Figure 9:
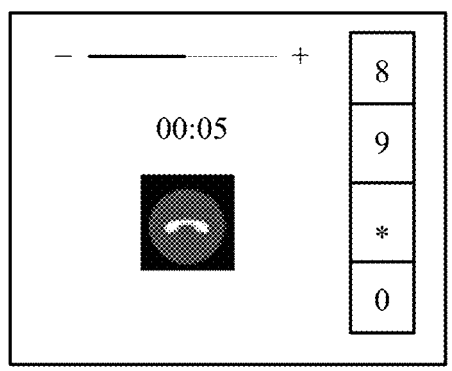
FIG. 9 is a schematic diagram of a method for displaying a digit and a symbol in a rolling manner according to an embodiment of the present invention.

Specifically, if the phone number of the communication peer device is a service number, as shown in FIG. 9, digits (0 to 9) and symbols (* and #) may be displayed in a form of a rolling window and in a blank area of a display unit 140 (a current call screen) in the smartwatch 100. A user may slide the rolling window so that a digit or a symbol that needs to be entered is displayed in the rolling window, and select the digit or the symbol that needs to be entered.

Figure 10:
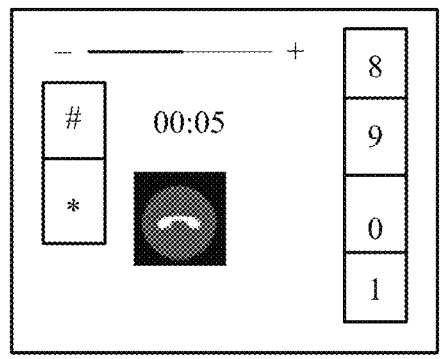
FIG. 10 (a) and FIG. 10 (b) are schematic diagrams of a method for displaying a digit in a rolling manner according to an embodiment of the present invention.
Figure 10:
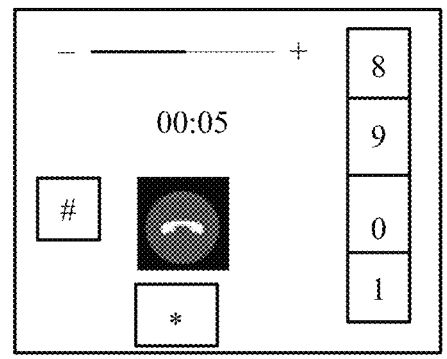

Alternatively, as shown in FIG. 10 (a) and FIG. 10 (b), it may be that only the digits (0 to 9) are displayed in the form of a rolling window and on the display unit 140 (the current call screen) in the smartwatch 100, and the symbols (* and #) are fixedly displayed on the display unit 140. The symbols may be fixed to one side or a top or a bottom or two sides of the rolling window. This is not limited in this embodiment of the present invention.

Figure 11:
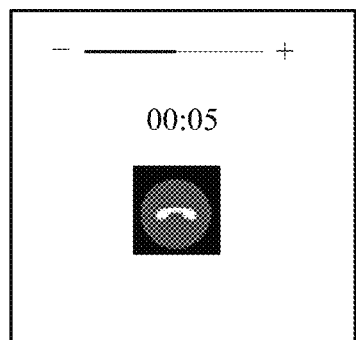
FIG. 11 is a schematic diagram of a method for displaying a digit and/or a symbol in a rolling manner according to an embodiment of the present invention.
Figure 11:
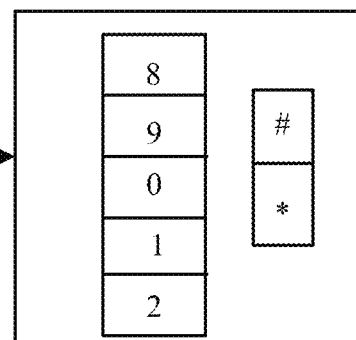

Alternatively, as shown in FIG. 11, if the phone number of the communication peer device is a service number, the current call screen of the smartwatch 100 may be switched to a new interface. The digits (0 to 9) and the symbols (* and #) are displayed in the form of a rolling window and in a blank area of the new interface, or only the digits (0 to 9) are displayed in the form of a rolling window and the symbols (* and #) are fixed to one side or two sides or a top or a bottom of the rolling window.

Figure 12:
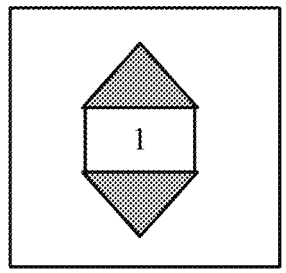
FIG. 12 (a), FIG. 12 (b), and FIG. 12 (c) are schematic diagrams of displaying a digit and/or a symbol in a key manner according to an embodiment of the present invention.
Figure 12:
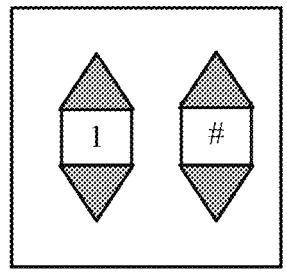
Figure 12:
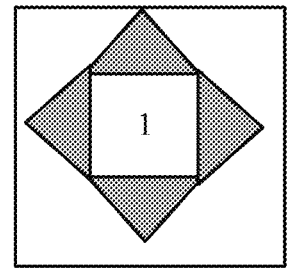

Optionally, the rolling window may use a direction key to display the digit or the symbol. Specifically, as shown in FIG. 12 (*a*) to (*c*), a gray filling part in the figure is a virtual key. For example, in FIG. 12 (*a*), the user may select, by using up and down keys, the digit and the symbol that need to be entered. Alternatively, as shown in FIG. 12 (*b*), the user may select, by using up and down keys on the left side of the interface, the digit that needs to be entered, and select, by using up and down keys on the right side of the interface, the symbol that needs to be entered. Alternatively, as shown in FIG. 12 (*c*), the user may select, by using up and down keys, the digit that needs to be entered, and select, by using left and right keys, the symbol that needs to be entered. However, the present invention is not limited to the key display manner shown in FIG. 12 (*a*) to (*c*). In addition, the keys shown in FIG. 12 (*a*) to (*c*) may be displayed on the current call screen, or may be displayed on the new interface.

S3400. Convert a digit or a symbol that is entered by a user by using the digital keyboard screen into a DTMF tone, and send the DTMF tone to the communication peer device.

Specifically, each time the user enters a digit or a symbol by using the digital keyboard screen, the smartwatch 100 sends a combined signal corresponding to the digit or the symbol to the call peer end. The combined signal is formed by superposing a high-frequency signal and a low-frequency signal. For example, if the user enters a digit 4, the smartwatch 100 sends, to the call peer end, a combined signal formed by superposing a 770 Hz signal and a 1209 Hz signal.

Figure 13:
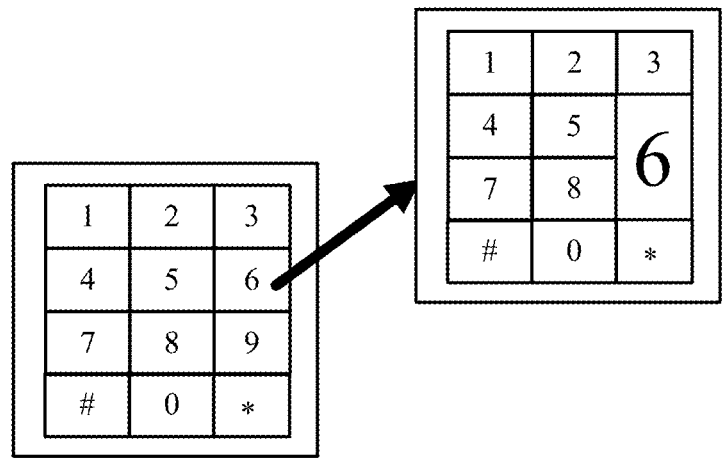
FIG. 13 is a schematic diagram of a method for selecting a digit and/or a symbol according to an embodiment of the present invention.

Optionally, if in S3300, the digits and/or the symbols are not displayed in the form of a rolling window, and a digital keyboard screen shown in FIG. 13 is switched to when the phone number of the communication peer device is a service number, in this case, in S3400, after the user taps a digit or a symbol, a preset range corresponding to the digit or the symbol may be enlarged. After the user taps the digit or the symbol again, the digit or the symbol that is entered by the user is converted into a DTMF tone so as to be sent to the communication peer device. For example, as shown in FIG. 13, after the user taps a digit 6, a preset range of the digit 6 is enlarged. After the user taps the digit 6 again, the digit 6 is converted into a DTMF tone so as to be sent to the communication peer device. Alternatively, after the user taps a digit or a symbol, according to an area selected by the user, a preset range of a digit or a symbol in the area and a preset range of a neighboring digit or symbol are enlarged, waiting for reentering of the user (not shown in the figure).

Figure 14:
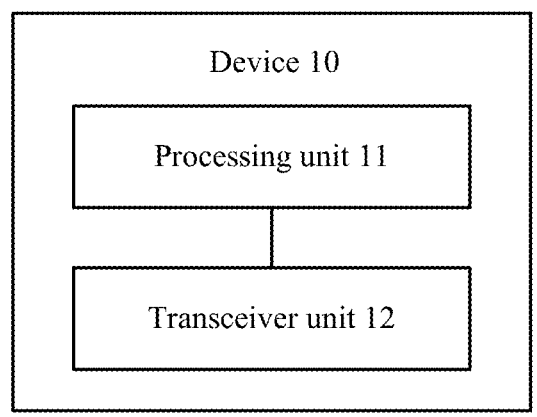
FIG. 14 is a schematic block diagram of a device according to an embodiment of the present invention.

The interaction methods in a call according to the embodiments of the present invention are described in detail above with reference to FIG. 3 to FIG. 13. A device according to an embodiment of the present invention is described in detail below with reference to FIG. 14. As shown in FIG. 14, a device 10 includes:

a processing unit 11, configured to display a voice assistant icon on a call screen of a wearable device when a phone number of a communication peer device is a service number, where the processing unit 11 may determine whether the phone number of the communication peer device is a service number, or may determine, according to an indication message sent by another device, whether the phone number of the communication peer device is a service number, where the processing unit 11 is further configured to: when it is detected that the voice assistant icon is activated (it is detected that the voice assistant icon is pressed), convert, into a corresponding dual tone multi frequency DTMF tone, voice information received after the voice assistant icon is activated; and a transceiver unit 12, configured to send the DTMF tone to the communication peer device.

Therefore, according to the device in this embodiment of the present invention, in a process in which a user makes or answers a service call by using the device, under a specific trigger condition, voice information of the user is converted into a dual tone multi frequency tone so as to be sent to the communication peer device. In this way, when the user needs to enter a digit or a symbol in a call process, it can be ensured that the user enters correct information, and user experience is improved.

In this embodiment of the present invention, optionally, the processing unit 11 is specifically configured to: identify digital information and/or symbol information in the voice information; and convert the digital information and/or the symbol information into the DTMF tone.

In this embodiment of the present invention, optionally, the sending unit 12 is specifically configured to: when it is identified that the voice information includes preset symbol information, send, to the communication peer device, a DTMF tone corresponding to the digital information and/or the symbol information identified before the preset symbol information.

In this embodiment of the present invention, optionally, the processing unit 11 is specifically configured to: when it is identified that the voice information includes preset symbol information, convert the digital information and/or the symbol information identified before the preset symbol information into the DTMF tone.

In this embodiment of the present invention, optionally, the processing unit 11 is specifically configured to convert the digital information and/or the symbol information into the DTMF tone when it is not detected that an input time of the voice information exceeds preset duration.

In this embodiment of the present invention, optionally, the processing unit 11 is further configured to: when it is identified that the voice information includes the preset symbol information, disable a function for converting the voice information into the DTMF tone and deactivate the voice assistant icon, that is, the voice assistant icon is pressed again.

The transceiver unit 12 is further configured to send, to the communication peer device, voice information received after the voice assistant icon is deactivated.

In this embodiment of the present invention, optionally, the processing unit 11 is further configured to: display a symbol information icon of the preset symbol when the voice assistant is activated; and deactivate the voice assistant icon when the symbol information icon of the preset symbol is activated.

In this embodiment of the present invention, optionally, the device 10 is a wearable device.

It should be understood that the device 10 is implemented in a form of a functional unit. The term "unit" may be an application-specific integrated circuit (Application Specific Integrated Circuit, ASIC for short), an electronic circuit, a processor (such as a shared processor, a dedicated processor, or a group processor) configured to execute one or more software or firmware programs, a memory, a combined logic circuit, and/or another appropriate component that supports the described functions. In an optional example, a person skilled in the art may understand that the device 10 may be configured to perform processes and/or steps in the method 1000 in the foregoing method embodiment. To avoid repetition, details are not described herein again.

Figure 15:
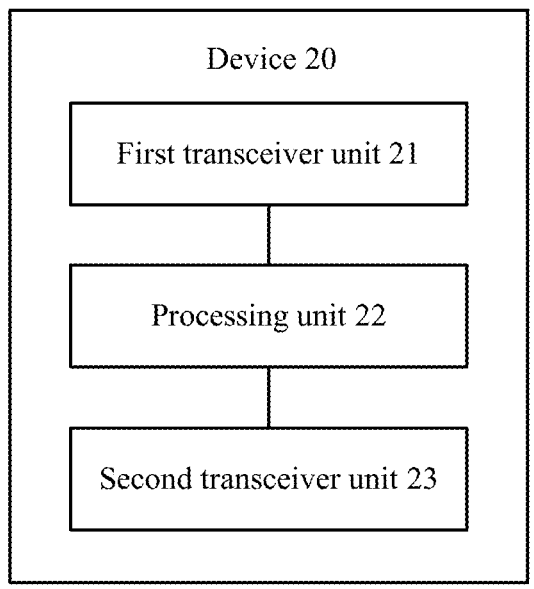
FIG. 15 is a schematic block diagram of a device according to another embodiment of the present invention.

FIG. 15 shows a device 20 according to another embodiment of the present invention. A wearable device calls a communication peer device by using the device 20, and the device 20 includes:

a first transceiver unit 21, configured to communicate with the wearable device, and specifically, may be configured to receive a phone number of the communication peer device sent by the wearable device;

a second transceiver unit 23, configured to communicate with the communication peer device; and a processing unit 22, configured to: determine whether the phone number of the communication peer device is a service number, and when determining that the phone number of the communication peer device is a service number, send, to the wearable device by using the first transceiver unit 21, indication information that is used to indicate that the phone number of the communication peer device is a service number, so that the wearable device displays a voice assistant icon on a call screen of the wearable device according to the indication information.

The first transceiver unit 21 is further configured to receive indication information that is sent by the wearable device and that is used to instruct to enable a function for converting voice information into a DTMF tone, and receive voice information sent by the wearable device. After the first transceiver unit 21 receives the indication information that is used to instruct to enable the function for converting voice information into a DTMF tone, the processing unit 22 converts the voice information into a dual tone multi frequency DTMF tone, and instructs the second transceiver unit 23 to send the DTMF tone obtained by means of conversion to the communication peer device. When the first transceiver unit 21 does not receive the indication information that is sent by the wearable device and that is used to instruct to enable the function for converting voice information into a DTMF tone or after the first transceiver unit 21 receives indication information that is used to instruct to disable the function for converting voice information into a DTMF tone, the processing unit 22 instructs the second transceiver unit 23 to send, to the communication peer device, the voice information received by the first transceiver unit 21.

In this embodiment of the present invention, optionally, the device 20 is a mobile phone, the first transceiver unit 21 is a Bluetooth module in the mobile phone, and the second transceiver unit 23 is an RF circuit in the mobile phone.

It should be understood that the device 20 is implemented in a form of a functional unit. The term "unit" may be an application-specific integrated circuit (Application Specific Integrated Circuit, ASIC for short), an electronic circuit, a processor (such as a shared processor, a dedicated processor, or a group processor) configured to execute one or more software or firmware programs, a memory, a combined logic circuit, and/or another appropriate component that supports the described functions. In an optional example, a person skilled in the art may understand that the device 20 may be configured to perform related processes and/or steps in the method 1000 in the foregoing method embodiment. To avoid repetition, details are not described herein again.

Figure 16:
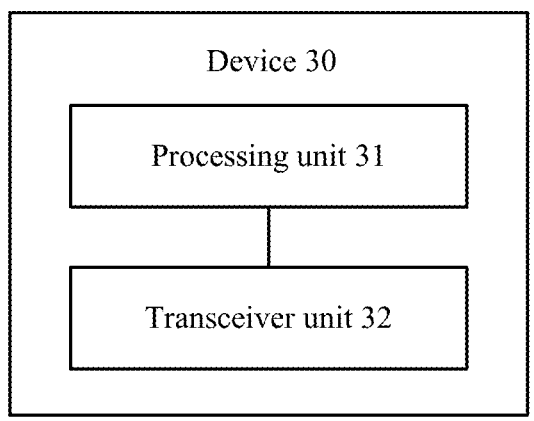
FIG. 16 is a schematic block diagram of a device according to still another embodiment of the present invention.

FIG. 16 shows a device 30 according to still another embodiment of the present invention. As shown in FIG. 16, the device 30 includes:

a processing unit 31, configured to: determine whether a phone number of a communication peer device is a service number, and when a number type of the phone number of the communication peer device is a service number, detect whether a function key is triggered, where the processing unit 31 is further configured to convert received voice information into a dual tone multi frequency DTMF tone when the function key is triggered; and the transceiver unit 32, configured to send the DTMF tone to the communication peer device.

Therefore, according to the device in this embodiment of the present invention, in a process in which a user makes or answers a service call by using the device, under a specific trigger condition, voice information of the user is converted into a dual tone multi frequency tone so as to be sent to the communication peer device. In this way, when the user needs to enter a digit or a symbol in a call process, it can be ensured that the user enters correct information, and user experience is improved.

In this embodiment of the present invention, optionally, if the function key is triggered when the phone number of the communication peer device is not a service number, the processing unit 31 executes a function corresponding to the function key, where the function corresponding to the function key is not a function for converting the received voice information into the DTMF tone.

In this embodiment of the present invention, optionally, when the number type of the phone number of the communication peer device is a service number, the processing unit 31 is further configured to prompt a user to trigger the function key, to enable the function for converting the received voice information into the DTMF tone.

It should be understood that the device 30 is implemented in a form of a functional unit. The term "unit" may be an application-specific integrated circuit (Application Specific Integrated Circuit, ASIC for short), an electronic circuit, a processor (such as a shared processor, a dedicated processor, or a group processor) configured to execute one or more software or firmware programs, a memory, a combined logic circuit, and/or another appropriate component that supports the described functions. In an optional example, a person skilled in the art may understand that the device 30 is a wearable device and may be configured to perform processes and/or steps in the method 2000 in the foregoing method embodiment. To avoid repetition, details are not described herein again.

Figure 17:
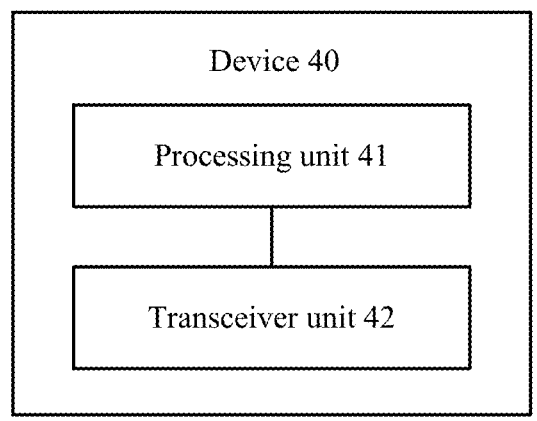
FIG. 17 is a schematic block diagram of a device according to still another embodiment of the present invention.

FIG. 17 shows a device 40 according to still another embodiment of the present invention. As shown in FIG. 17, the device 40 includes:

a processing unit 41, configured to: determine whether a phone number of a communication peer device is a service number, and detect gesture input when a number type of the phone number of the communication peer device is a service number, where the processing unit 41 is further configured to convert received voice information into a dual tone multi frequency DTMF tone when the gesture input is a preset gesture; and a transceiver unit 42, configured to send the DTMF tone to the communication peer device.

In this embodiment of the present invention, optionally, when the phone number of the communication peer device is a service number, the processing unit 41 is further configured to prompt a user to enter the preset gesture, to enable a function for converting the received voice information into the DTMF tone.

It should be understood that the device 40 is implemented in a form of a functional unit. The term "unit" may be an application-specific integrated circuit (Application Specific Integrated Circuit, ASIC for short), an electronic circuit, a processor (such as a shared processor, a dedicated processor, or a group processor) configured to execute one or more software or firmware programs, a memory, a combined logic circuit, and/or another appropriate component that supports the described functions. In an optional example, a person skilled in the art may understand that the device 40 is a wearable device and may be configured to perform processes and/or steps in the method 2000 in the foregoing method embodiment. To avoid repetition, details are not described herein again.

Figure 18:
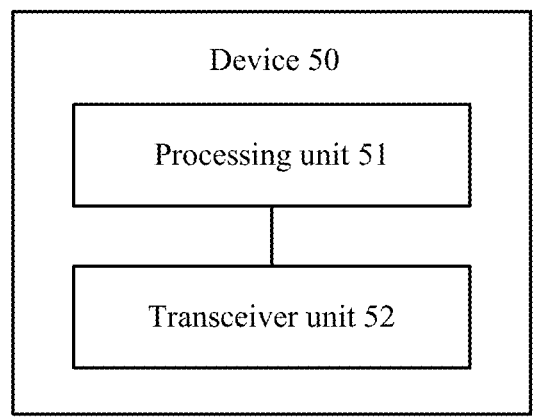
FIG. 18 is a schematic block diagram of a device according to still another embodiment of the present invention.

FIG. 18 shows a device 50 according to still another embodiment of the present invention. As shown in FIG. 18, the device 50 includes:

a processing unit 51, configured to: when a phone number of a communication peer device is a service number, display, on the wearable device, icons corresponding to a digit and a symbol, where the digit includes 0 to 9, and the symbol includes * and #; and a transceiver unit 52, configured to: when one icon of the icons of the digit and the symbol is entered, send a dual tone multi frequency DTMF tone corresponding to the icon to the communication peer device, where at least some of the icons of the digit and the symbol are simultaneously displayed on a display screen of the wearable device, and the icons of the digit and the symbol roll in two directions based on an operation of a rolling apparatus.

Therefore, according to the device in this embodiment of the present invention, in a process in which a user makes or answers a service call by using the device, the digit and the symbol are displayed in a rolling manner on the display screen of the device. In this way, when the user needs to enter a digit or a symbol in a call process, it can be ensured that the user enters correct information, and user experience is improved.

In this embodiment of the present invention, optionally, an icon corresponding to the symbol is always displayed on the display screen, and an icon corresponding to the digit rolls in the two directions based on the operation of the rolling apparatus.

In this embodiment of the present invention, optionally, the rolling apparatus is a touchscreen or a direction key.

It should be understood that the device 50 is implemented in a form of a functional unit. The term "unit" may be an application-specific integrated circuit (Application Specific Integrated Circuit, ASIC for short), an electronic circuit, a processor (such as a shared processor, a dedicated processor, or a group processor) configured to execute one or more software or firmware programs, a memory, a combined logic circuit, and/or another appropriate component that supports the described functions. In an optional example, a person skilled in the art may understand that the device 50 may be configured to perform processes and/or steps in the method 3000 in the foregoing method embodiment. To avoid repetition, details are not described herein again.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. An interaction method in a call, applied to a call scenario of a smartwatch and a communication peer device, the method comprising:
 establishing communication between the smartwatch and the communication peer device;
 displaying a voice assistant icon on a touchscreen of the smartwatch when a phone number of the communication peer device is a service number;
 receiving input on the voice assistant icon;

activating, in response to the input, a function for converting voice information into a dual tone multi frequency (DTMF) tone;

receiving voice information;

converting, by the function, received voice information into a DTMF tone; and sending the DTMF tone to the communication peer device.

2. The method of claim 1, wherein converting the received voice information into the DTMF tone comprises:

identifying digital information or symbol information in the voice information; and converting the digital information or the symbol information into the DTMF tone.

3. The method of claim 2, wherein the voice information comprises preset symbol information, and wherein sending the DTMF tone to the communication peer device comprises sending a DTMF tone corresponding to the digital information or the symbol information identified, before sending the preset symbol information.

4. The method of claim 2, wherein the voice information comprises preset symbol information, and wherein converting the digital information or the symbol information into the DTMF tone comprises converting the digital information or the symbol information identified, before converting the preset symbol information into the DTMF tone.

5. The method of claim 2, wherein converting the digital information or the symbol information into the DTMF tone further comprises converting the digital information or the symbol information into the DTMF tone when an input time of the voice information does not exceed a preset duration.

6. The method of claim 2, further comprising:

deactivating the voice assistant icon when identifying that the voice information comprises preset symbol information; and sending, to the communication peer device, voice information received after the voice assistant icon is deactivated.

7. The method of claim 6, further comprising:

displaying a symbol information icon when the voice assistant icon is activated; and deactivating the voice assistant icon comprising deactivating the voice assistant icon when the symbol information icon is activated.

8. The method of claim 2, wherein the method is executed by the smartwatch.

9. The method of claim 8, further comprising calling, by the smartwatch, the communication peer device using a wireless terminal device, and wherein displaying the voice assistant icon on the call screen further comprises:

receiving an indication message from the wireless terminal device, the indication message indicating that the phone number of the communication peer device is the service number; and displaying the voice assistant icon on the call screen according to the indication message.

10. The method of claim 8, further comprising calling, by the smartwatch, the communication peer device using a wireless terminal device, converting the received voice information into the DTMF tone, and sending the DTMF tone to the communication peer device comprising:

instructing the wireless terminal device to enable a function for converting the voice information into the DTMF tone when the voice assistant icon is activated; and sending the received voice information to the wireless terminal device to enable the wireless terminal device to convert the voice information into the DTMF tone and to send the DTMF tone to the communication peer device.

11. A smartwatch, comprising:

a bus system;

a processor coupled to the bus system;

a memory coupled to the bus system and configured to store instructions;

a transceiver coupled to the bus system and configured to receive and send a message according to control of the processor to implement communication between the smartwatch and a communication peer device;

a touchscreen coupled to the bus system and configured to:

receive touch input of a user; and display information according to control of the processor; and a microphone coupled to the bus system and configured to receive voice input of the user, wherein the instructions cause the processor to be configured to:

instruct the touchscreen to display a voice assistant icon on a call screen of the smartwatch when a phone number of the communication peer device is a service number;

convert received voice information into a dual tone multi frequency (DTMF) tone when it is detected that the voice assistant icon is activated by gesture input; and send the DTMF tone to the communication peer device using the transceiver.

12. The smartwatch of claim 11, wherein the instructions further cause the processor to be configured to:

identify digital information or symbol information in the voice information; and convert the digital information or the symbol information into the DTMF tone.

13. The smartwatch of claim 12, wherein the voice information comprises preset symbol information, and wherein the instructions further cause the processor to be configured to send, to the communication peer device using the transceiver, a DTMF tone corresponding to the digital information or the symbol information identified before the preset symbol information.

14. The smartwatch of claim 12, wherein the voice information comprises preset symbol information, and wherein the instructions further cause the processor to be configured to convert the digital information or the symbol information identified before the preset symbol information into the DTMF tone.

15. The smartwatch of claim 12, wherein the instructions further cause the processor to be configured to convert the digital information or the symbol information into the DTMF tone when an input time of the voice information does not exceed a preset duration.

16. The smartwatch of claim 12, wherein the instructions further cause the processor to be configured to:

deactivate the voice assistant icon when it is identified that the voice information comprises preset symbol information; and send, to the communication peer device using the transceiver, voice information received by the microphone after the voice assistant icon is deactivated.

17. The smartwatch of claim 16, wherein the instructions further cause the processor to be configured to:

control the touchscreen to display a symbol information icon when the voice assistant icon is activated; and deactivate the voice assistant icon when the symbol information icon is activated.

18. The smartwatch of claim 11, further comprising a short-range transceiver coupled to the bus system and configured to perform short-range communication with a wireless terminal device, wherein the instructions further cause the processor to be configured to receive, using the short-range transceiver, indication information from the wireless terminal device indicating that the phone number of the communication peer device is the service number.

19. A non-transitory computer-readable storage medium comprising instructions, in which when executed by a smartwatch, cause the smartwatch to:
- establish communication between the smartwatch and a communication peer device;
- display a voice assistant icon on a touchscreen of the smartwatch when a phone number of the communication peer device is a service number;
- receive input on the voice assistant icon;
- activate, in response to the input, a function for converting voice information into a dual tone multi frequency (DTMF) tone;
- receive voice information;
- convert, by the function, received voice information into a DTMF tone; and
- send the DTMF tone to the communication peer device.

* * * * *